Figure 1:
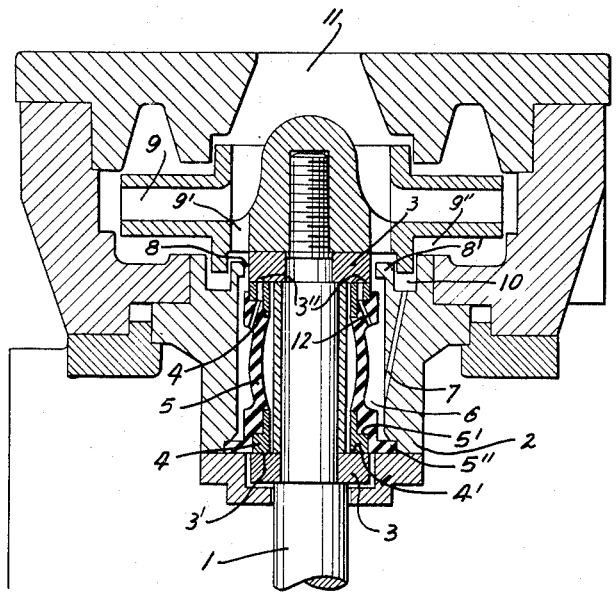

INVENTOR:
Karl Wernert
BY:
Michael S. Striker
agt.

United States Patent Office 2,779,611
Patented Jan. 29, 1957

2,779,611

SEALING ARRANGEMENT FOR SHAFTS

Karl Wernert, Muhlheim an der Ruhr, Germany

Application February 26, 1953, Serial No. 339,013

Claims priority, application Germany March 3, 1952

9 Claims. (Cl. 286—9)

The present invention refers to a sealing arrangement for shafts and more particularly to the sealing of the shaft of a pump or turbine by means of a resilient rubber sleeve.

It is the object of the present invention to provide a resilient rubber sleeve surrounding a shaft for urging rotary and stationary sealing elements together.

It is another object of the present invention to adjust the pressure exerted by the rubber sleeve against the sealing elements to the pressure of the sealed fluid by providing an annular chamber around the rubber sleeve communicating with the sealed fluid.

It is a further object of the present invention to provide on a shaft two spaced sealing members connected to the ends of an outwardly bulging rubber sleeve and resiliently pressed apart by the same for engaging sealing faces on the shaft.

It is a still further object of the present invention to supply a cooling medium to the chamber surrounding the rubber sleeve and to provide conduits permitting admission of such cooling medium to the sealing faces of the sealing elements.

With these objects in view the present invention mainly consists in a sealing arrangement comprising a shaft means having at least one annular sealing face, and at least one annular sealing member loosely mounted on the shaft and engaging with the sealing face thereof the sealing face of the shaft means. A rubber sleeve surrounds the shaft and is connected at one end thereof to the sealing member and at the other end thereof supported by a supporting member for urging the sealing member against the sealing face of the shaft means. The supporting member is fluid tightly secured to the rubber sleeve.

Preferably the supported portion of the rubber sleeve is provided with a flange which is fluid tightly engaged by the supporting member while a gap between the supporting member and the shaft means permits entering of fluid into a space between the supporting member and the sleeve so that the pressure of the fluid acts on the bulging sleeve in radial direction so that a sealing member secured to the end of the rubber sleeve is pressed against the sealing face of the shaft means with a pressure corresponding to the pressure of the sealed fluid.

Sealing arrangements for sealing a rotary shaft by means of a spring acting on a sealing element are known. A disadvantage of the known arrangement is that the sealing pressure is constant. In contrast thereto the bulging rubber sleeve according to the present invention exerts a force on the sealing element which is directly proportional to the pressure of the fluid sealed by the sealing element so that at high pressure perfect sealing is obtained, while at low pressure no unnecessary friction is produced. Moreover, the fluid surrounding the rubber sleeve acts as a cooling medium and carries away the heat produced by a friction.

In the event that the sealing arrangement according to the present invention is used for sealing a gaseous or very hot medium, the rubber sleeve is fluid tightly secured at both ends thereof to a supporting member so as to define with the same a closed annular space, and the supporting member is provided with conduits for the admission of a cooling medium to the annular space whereby the sealing elements are cooled.

Figure 2:
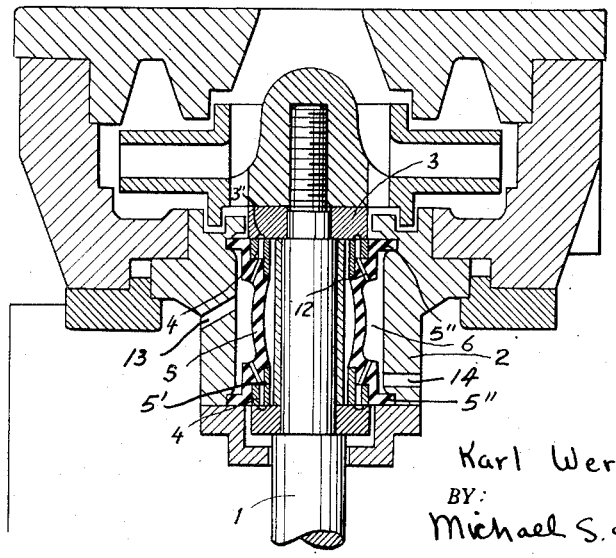

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a longitudinal sectional view of the preferred embodiment of the present invention; and Fig. 2 is a longitudinal sectional view of a modified embodiment of the present invention.

Referring now to the drawings and more particularly to Fig. 1, the rotary shaft 1 is surrounded by the stationary supporting member 2. Fixedly secured to shaft 1 are two spaced sealing rings 3 having annular transverse sealing faces 3' against which the sealing faces 4' of the annular sealing members 4 are pressed by the rubber sleeve 5. The annular sealing members 4 are mounted on inner annular shoulders 5' of the rubber sleeve 5, held therein by resilient pressure or by other suitable means.

The flange 5'' is fluid tightly pressed into a groove of the supporting member 2. The annular space 6 defined by the inner surface of the supporting member 2 and the outer surface of the rubber sleeve 5 is closed at one end by the flange 5'', and open at the other end permitting communication of annular space 6 with the chamber 11 through the conduit 9' of the rotary impeller element 9 of a hydraulic apparatus and through the annular gap 8 which is formed between the inner flange 8' of the supporting member and the sealing ring 3. Conduit means 12 are preferably provided which pass through the rubber sleeve and through at least one of the sealing members 4 opening into a groove 3'' on the sealing face 3'.

The arrangement shown in Fig. 1 operates as follows:

The rubber sleeve 5 resiliently presses the sealing members 4 apart and against the sealing rings 3 so that the sealing faces 3' and 4' engage each other fluid tightly. The fluid contained in the chamber 11 communicates through the intermediate space 10 which has an intermediate pressure, and through conduit 7 with the annular space 6. The communication of the annular space 6 with the chamber 11 through the throttling gap 8 prevents a pressure that is too far below atmospheric pressure in the annular space 6.

Consequently the pressure in the annular space 6 acts upon the rubber sleeve 5 increasing or decreasing the resilient pressure between the sealing elements 3 and 4 in accordance with the pressure of the fluid which is sealed by the arrangement.

In the modified embodiment shown in Fig. 2 of the drawing, the rubber sleeve 5 is provided with two flanges 5'' fluid tightly secured to the supporting member 2. Consequently the annular space 6 is closed and sealed from the chamber 11. Channels 13, 14 are provided in the supporting member 2 through which the fluid medium circulates for cooling the rubber sleeve and the sealing elements.

It will be understood that each of the elements described above, or two or more together, may also find a useful application in other types of sealing arrangements differing from the types described above.

While the invention has been illustrated and described as embodied in a bulging rubber sleeve surrounding a shaft and pressing annular sealing elements together, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A sealing arrangement comprising, in combination, a rotary shaft means; a pair of spaced sealing rings fixedly secured to said shaft means and having two spaced transverse sealing faces facing each other, at least one of said sealing faces being formed with a groove; two spaced annular sealing members loosely mounted on said shaft means and being movable in an axial direction, each sealing member having an annular sealing face engaging one of said sealing faces of said sealing rings, at least the sealing member cooperating with said one sealing face being formed with conduit means passing therethrough and having one end thereof opening on the sealing face of the respective sealing member so as to communicate with said groove; an at least partly outwardly bulging rubber sleeve surrounding said shaft means spaced from the same, said rubber sleeve being connected at the ends thereof to said sealing members and resiliently urging the same against said sealing faces of said sealing rings, said rubber sleeve having outwardly projecting radial flanges at the ends thereof, said rubber sleeve being formed with at least one passage passing therethrough and communicating at one end thereof with the other end of said conduit means so as to form a continuation of the same; and a stationary tubular supporting member surrounding said rubber sleeve and fluid tightly engaging said flanges and supporting said rubber sleeve, said supporting member defining with said rubber sleeve an annular space, and being formed with passages for admission and discharge of a cooling medium into said annular space so that the pressure in said annular space and between said sealing faces varies depending on the pressure of said cooling medium, said annular space communicating with the other end of the passage through the rubber sleeve and through said last-mentioned passage with said conduit means.

2. A sealing arrangement comprising, in combination, a rotary shaft means having two spaced transverse sealing faces facing each other; two spaced annular sealing members loosely mounted on said shaft means and being movable in an axial direction, each sealing member having an annular sealing face engaging one of said sealing faces of said shaft means; an at least partly outwardly bulging sleeve consisting of a resilient material and surrounding said shaft means spaced from the same, said sleeve engaging at the ends thereof said sealing members and resiliently urging the same against said sealing faces of said shaft means; and a stationary tubular supporting member fluid-tightly engaging and supporting at least one end of said sleeve, said tubular supporting member defining with the outer surface of said sleeve an annular space and being formed with a conduit passing therethrough and opening at one end thereof into said annular space and adapted to communicate at the other end thereof with a fluid under varying pressure.

3. A sealing arrangement comprising, in combination, a rotary shaft means having two spaced transverse sealing faces facing each other; two spaced annular sealing members loosely mounted on said shaft means and being movable in an axial direction, each sealing member having an annular sealing face engaging one of said sealing faces of said shaft means; an at least partly outwardly bulging sleeve consisting of a resilient material and surrounding said shaft means spaced from the same, said sleeve being formed at the ends thereof with annular shoulders engaging and holding said sealing members and resiliently urging the same against said sealing faces of said shaft means, said sleeve having an outwardly extending radial projection on at least one end thereof; and a stationary tubular supporting member fluid-tightly engaging and supporting at least said one end of said sleeve, said tubular supporting member defining with the outer surface of said sleeve an annular space and being formed with a conduit passing therethrough and opening at one end thereof into said annular space and adapted to communicate at the other end thereof with a fluid under varying pressure.

4. A sealing arrangement comprising in combination, a rotary shaft means having two spaced transverse sealing faces facing each other; two spaced annular sealing members loosely mounted on said shaft means and being movable in an axial direction, each sealing member having an annular sealing face engaging one of said sealing faces of said shaft means; and at least a partly outwardly bulging sleeve consisting of a resilient material and surrounding said shaft means spaced from the same, said sleeve being formed at the ends thereof with annular shoulders engaging and holding said sealing members and resiliently urging the same against said sealing faces of said shaft means, said sleeve having an outwardly extending radial projection on at least one end thereof; and a stationary tubular supporting member fluid-tightly engaging and supporting said one end of said sleeve, said tubular supporting member defining with the outer surface of said sleeve an annular space closed at said one end of said sleeve and opening in an annular gap in the region of the other end of said sleeve, said tubular supporting member being forced with a conduit passing therethrough and opening at one end thereof into said annular space and adapted to communicate at the other end thereof with a fluid under varying pressure so that said fluid passes through said conduit, said annular space and through said gap.

5. A sealing arrangement, comprising in combination, a rotary shaft: a pair of spaced sealing rings fixedly secured to said shaft, each sealing ring having a transverse sealing face facing the sealing face of the other ring; two spaced annular sealing members loosely mounted on said shaft and being movable in an axial direction, each sealing member having an annular sealing face engaging one of said sealing faces of said sealing rings; and at least a partly outwardly bulging sleeve consisting of a resilient material and surrounding said shaft spaced from the same, said sleeve being formed at the ends thereof with annular shoulders engaging and holding said sealing members and resiliently urging the same against said sealing faces of said sealing rings, said sleeve having an outwardly extending radial projection on at least one end thereof; and a stationary tubular supporting member fluid-tightly engaging and supporting said one end of said sleeve, said tubular supporting member defining with the outer surface of said sleeve an annular space closed at said one end of said sleeve and opening in an annular gap in the region of the other end of said sleeve, said annular gap being formed by the inner surface of said tubular supporting member and by the outer surface of one of said sealing rings, said tubular supporting member being formed with a conduit passing therethrough and opening at one end thereof into said annular space and adapted to communicate at the other end thereof with a fluid under varying pressure so that said fluid passes through said conduit, said annular space and through said gap.

6. A sealing arrangement, comprising in combination, a rotary shaft; a pair of spaced sealing rings fixedly secured to said shaft, each sealing ring having a transverse sealing face facing the sealing face of the other ring; two spaced annular sealing members loosely mounted on said shaft and being movable in an axial direction, each sealing member having an annular sealing face engaging one of said sealing faces of said sealing rings; and at least a partly outwardly bulging sleeve consisting of a resilient material and surrounding said shaft spaced from the same, said sleeve being formed at the ends thereof with annular shoulders engaging and holding said sealing members and resiliently urging the same against said sealing faces of sealing rings, said sleeve having an outwardly extending radial projection on at least one end thereof; and a stationary tubular supporting member fluid-tightly engaging and supporting said one end of said sleeve, said tubular supporting member having an inner flange located spaced in an axial direction from said one end of said sleeve, said tubular supporting member defining with the outer surface of said sleeve an annular space closed at said one end of said sleeve and opening in an annular gap in the region of the other end of said sleeve, said annular gap being formed by said inner flange of said tubular supporting member and by the outer surface of one of said sealing rings, said tubular supporting member being formed with a conduit passing therethrough and opening at one end thereof into said annular space and adapted to communicate at the other end thereof with a fluid under varying pressure so that said fluid passes through said conduit, said annular space and through said gap.

7. A sealing arrangement comprising, in combination, a rotary shaft means having two spaced transverse sealing faces facing each other; two spaced annular sealing members loosely mounted on said shaft means and being movable in an axial direction, each sealing member having an annular sealing face engaging one of said sealing faces of said shaft means; an at least partly outwardly bulging sleeve consisting of a resilient material and surrounding said shaft means spaced from the same, said sleeve engaging at the ends thereof said sealing members and resiliently urging the same against said sealing faces of said shaft means; and a stationary tubular supporting member fluid-tightly engaging and supporting one end of said sleeve, said stationary supporting member forming with said sleeve an annular gap spaced in an axial direction from said one end of said sleeve, said tubular supporting member defining with the outer surface of said sleeve an annular space and being formed with a conduit passing therethrough and opening at one end thereof into said annular space and adapted to communicate at the other end thereof with a fluid under varying pressure, said annular space being open at said annular gap.

8. A sealing arrangement as set forth in claim 2 wherein said supporting member fluid-tightly engages both ends of said sleeve so that said annular space is closed at each end thereof.

9. A sealing arrangement, comprising, in combination, a rotary shaft; a pair of spaced sealing rings fixedly secured to said shaft, each sealing ring having a transverse sealing face facing the sealing face of the other ring, one of said sealing faces being formed with a groove; two spaced annular sealing members loosely mounted on said shaft and being movable in an axial direction, each sealing member having an annular sealing face engaging one of said sealing faces of said sealing rings, the sealing member cooperating with said one sealing face being formed with conduit means passing therethrough and having one end thereof opening on the sealing face of the respective sealing member so as to communicate with said groove; and at least a partly outwardly buldging sleeve consisting of a resilient material and surrounding said shaft spaced from the same, said sleeve being formed at the ends thereof with annular shoulders engaging and holding said sealing members and resiliently urging the same against said sealing faces of said sealing rings, said sleeve having an outwardly extending radial projection on at least one end thereof, said rubber sleeve being formed with at least one passage passing therethrough and communicating at one end thereof with the other end of said conduit means so as to form a continuation of the same; and a stationary tubular supporting member fluid-tightly engaging and supporting said one end of said sleeve, said tubular supporting member defining with the outer surface of said sleeve an annular space closed at said one end of said sleeve and opening in an annular gap in the region of the other end of said sleeve, said annular gap being formed by the inner surface of said tubular supporting member and by the outer surface of one of said sealing rings, said annular space communicating with said passage, said tubular supporting member being formed with a conduit passing therethrough and opening at one end thereof into said annular space and adapted to communicate at the other end thereof with a fluid under varying pressure so that said fluid passes through said conduit, said annular space and through said gap and so that said fluid passes from said annular space through said passage and said conduit means to said groove.

References Cited in the file of this patent

UNITED STATES PATENTS

| | | |
|---|---|---|
| 1,366,879 | Dennedy | Jan. 25, 1921 |
| 1,505,321 | Dennedy | Aug. 19, 1924 |
| 1,876,515 | Emmet | Sept. 6, 1932 |
| 1,945,825 | Saxe | Feb. 6, 1934 |
| 1,997,613 | Vroom | Apr. 16, 1935 |
| 2,104,355 | Rupp et al. | Jan. 4, 1938 |
| 2,192,395 | La Bour | Mar. 5, 1940 |
| 2,215,034 | Gorman | Sept. 17, 1940 |
| 2,420,556 | Mueller | May 13, 1947 |
| 2,577,292 | Weber | Dec. 4, 1951 |

FOREIGN PATENTS

| | | |
|---|---|---|
| 322,711 | Great Britain | Dec. 12, 1929 |
| 458,262 | Great Britain | Dec. 16, 1936 |